Patented Feb. 24, 1931

1,794,046

UNITED STATES PATENT OFFICE

HANS WESCHE AND KARL BRODERSEN, OF DESSAU IN ANHALT, AND WERNER EXT, OF KIEL-KRONSHAGEN, GERMANY, ASSIGNORS TO WINTHROP CHEMICAL COMPANY, INC., OF NEW YORK, N. Y., A CORPORATION OF NEW YORK

INSECTICIDE

No Drawing. Application filed May 31, 1928, Serial No. 282,037, and in Germany August 9, 1926.

The invention relates to new insecticides and is based on the observation that aromatic monothiocyanates, the derivatives and substitution products of these thiocyanates are extraordinarily active in destroying insects. These comparatively difficultly volatile thiocyanates have the advantage that they are effective for a relatively long period and are not excluded from use by their odor. Individual insecticides according to this invention are, for example, benzylthiocyanate, thiocyanoaniline, thiocyanohydroxynaphthalene and so on.

The activity of these insecticides exceeds considerably that of insecticides hitherto known. They do not damage plants; they may be applied in any desired manner, for example, by scattering in conjunction with a usual diluent, by fumigation or by spraying in the form of a solution or emulsion.

The following examples illustrate the invention:

*Example 1.*—A mixture of 5 parts of benzylthiocyanate and 95 parts of talc are mixed to form a dusting agent. This suffices to kill in a very short time the larvæ and imagines of *Piesma quadrata*, which hitherto has not been possible with any synthetic agent.

The same action is obtained, for example, by use of thiocyanoaniline.

*Example 2.*—A solution is made by stirring together, while heating, 144 parts of colophony, 68 parts of caustic soda lye of 25 per cent. strength, 100 parts of alcohol, 82 parts of the first runnings of benzene distillation, 28 parts of water, 20 parts of benzylthiocyanate. A solution of 4 per cent. strength of this stock preparation constitutes a spraying agent which is suitable in a remarkable manner for exterminating the insects which winter in cellars or the like.

*Example 3.*—2,5 parts of thiocyanoaniline and 2,5 parts of benzylsulfocyanate are dissolved in 10 parts of α-chloronaphthalene and 5 parts of butylalcohol. 60 parts of an emulsifying agent are added, for instance a solution of 50 per cent. strength of the sodium salt of dibutylnaphthalenesulfonic acid or a soap. The mixture is then diluted to 100 parts by water. A solution of 1–2 per cent. strength of this stock preparation yields an excellent spraying agent for exterminating bugs or lice.

It is obvious to all skilled in the art that the present invention is not limited to the foregoing examples or to the details given therein. The effective thiocyanates may be used in a mixture with other known insecticides, other diluents may be added.

What we claim is:

1. As an insecticide a preparation containing as an active constituent an aromatic monothiocyanate.

2. As an insecticide a preparation containing as an active constituent an aromatic monothiocyanate of the benzene series.

3. As an insecticide a preparation containing as an active constituent benzene thiocyanate.

4. As an insecticide a preparation containing five parts of benzene thiocyanate and 95 parts of talc powder.

5. As an insecticide a preparation containing benzylthiocyanate, colophony soap, alcohol and compounds consisting of the first runnings of benzene distillation.

6. As an insecticide a preparation containing thiocyanoaniline, benzylsulfocyanate dissolved in alpha-chloronaphthalene and butyl alcohol, and an emulsifying agent.

In testimony whereof, we affix our signatures.

HANS WESCHE.
KARL BRODERSEN.
WERNER EXT.